N. RATCHFORD.
VEHICLE WHEEL.
APPLICATION FILED AUG. 28, 1919.

1,368,654. Patented Feb. 15, 1921.

Witness
A. Sundell

Inventor
Nicholas Ratchford
By
C. C. Shepherd
Attorney

UNITED STATES PATENT OFFICE.

NICHOLAS RATCHFORD, OF FORT RECOVERY, OHIO.

VEHICLE-WHEEL.

1,368,654.    Specification of Letters Patent.    Patented Feb. 15, 1921.

Application filed August 28, 1919. Serial No. 320,369.

*To all whom it may concern:*

Be it known that I, NICHOLAS RATCHFORD, a citizen of the United States, residing at Fort Recovery, in the county of Mercer and State of Ohio, have invented certain new and useful Improvements in Vehicle-Wheels, of which the following is a specification.

This invention relates to an improved vehicle wheel, and has particular reference to a wheel wherein is embodied a plurality of resilient spoke members, which in operation serve to render a wheel as a whole extremely resilient and to relieve the vehicle with which it is associated of the necessity of absorbing such shocks and jars as are incident to the passage of said vehicle over rough and uneven surfaces.

Another object of the invention resides in a wheel of the above character, wherein is provided an improved hub structure for effecting the securing of the inner ends of the resilient spokes, said hub structure being of such construction as to firmly receive and secure the inner ends of said spokes and to prevent such ends from rattling or becoming accidentally loosened from their respective seats within the hub structure, the latter also including a side flange wherein is formed a slot, whereby upon the rotation of said slot into registration with any one of said spokes, the spoke registering with said slot may be removed without disturbing the positions of the remaining spokes.

A further object of the invention resides in the provision of an improved rim structure with which the outer ends of said resilient spokes are connected, and wherein said rim is formed to provide an annular channel having continuous flanges in which the curved outer ends of said spokes are seated and braced against lateral stresses, and wherein said rim is formed with openings by means of which extraneous matter may be removed from between the spokes and the rim proper.

With these and other objects in view, as will appear as the description proceeds, the invention accordingly consists in the novel features of construction, combination of elements and arrangement of parts, hereinafter to be fully described and having the scope thereof pointed out in the appended claim.

Figure 1:
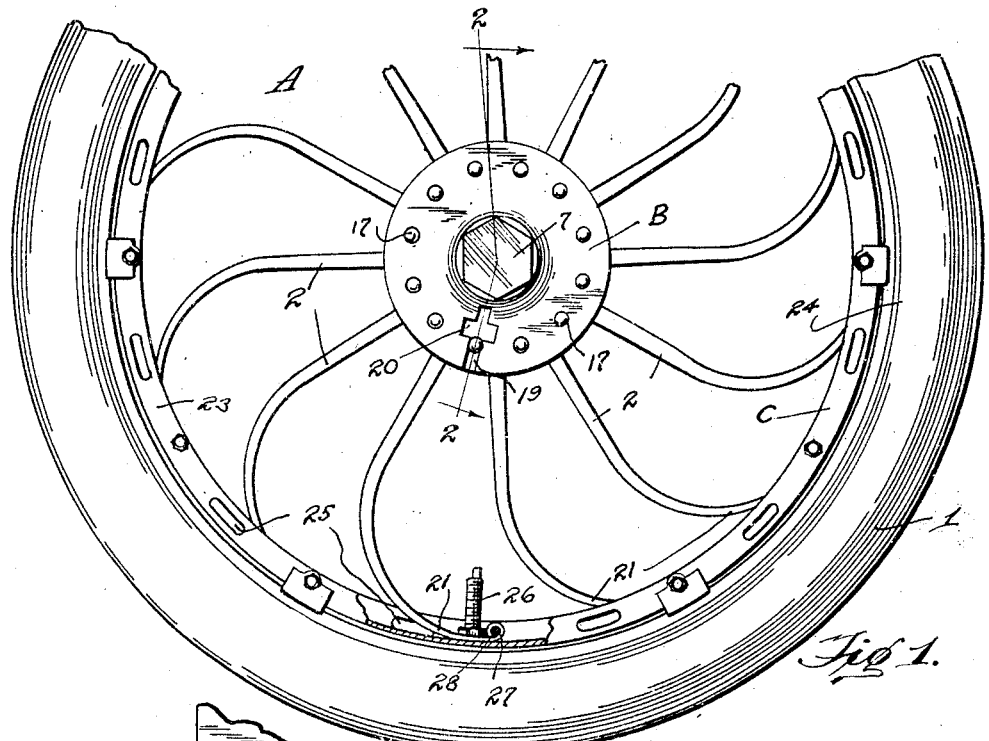
Figure 1 is a side elevation of a vehicle wheel constructed in accordance with the principles of the invention.

Referring more particularly to the drawings, the wheel A disclosed therein, and comprising the preferred form of the present invention, is particularly designed for use in conjunction with motor vehicles, and the general principle underlying the construction is to provide a wheel of this character which will tend to considerably diminish jolts imparted to a vehicle by the travel of the latter over a rough road bed and at the same time to so construct the wheel that the wear upon the tires employed thereon will be reduced to a very great extent and thus, through the use of the wheel, the life and wear of the tires will be appreciably enlarged. Pneumatic tires, such as are indicated by the numeral 1, are preferably used upon the wheel but other forms of tires, such as the solid form, may be used if desired.

To accomplish these and other ends, the wheel A is formed to embody a hub structure B and a rim structure C, between which are located and secured the resilient metallic spokes 2 of the wheel. In order to firmly secure the inner ends of the spokes 2 with the hub structure B, and to prevent accidental displacement or rattle on part of said spokes, said hub structure is formed to embody an axle sleeve 3, which is adapted to rotatably surround a vehicle axle 4. The end of the axle may be provided with the usual retaining nuts 5, which are situated to bear against the outer end of the sleeve 3 and retain the latter and the wheel as a whole in its rotatable position upon said axle. The sleeve 3 may be reduced centrally as shown at 6 to conform with a similar reduction in diameter of the axle 4, the reduced portion 6 serving to limit the inward thrust of said wheel upon the axle. A cap 7 may be threaded upon the outer end of the sleeve 3 and serves to incase the nuts 5 in the usual manner, to wheels of this character.

Figure 2:
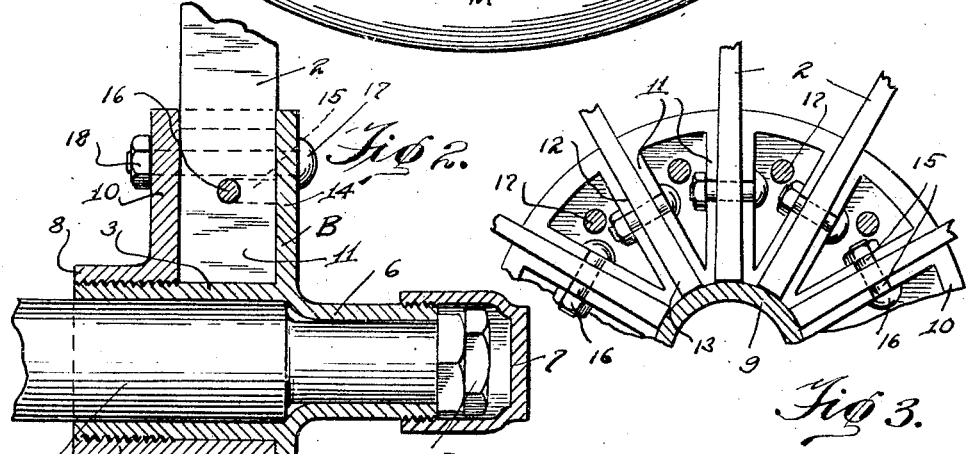
Fig. 2 is a vertical sectional view taken through the hub structure along the line 2—2 of Fig. 1.
Figure 3:
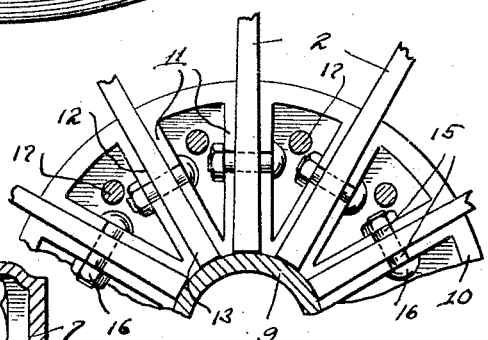
Fig. 3 is a fragmentary vertical sectional view taken through the hub structure and disclosing more particularly the method of securing the inner ends of the resilient spokes therein.
Figure 4:
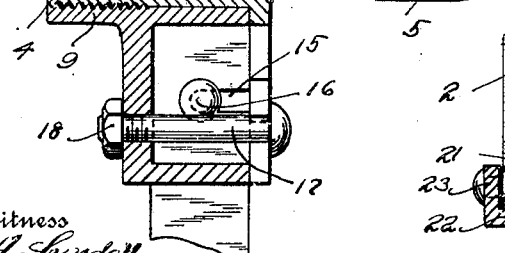
Fig. 4 is a detail view of the rim and the means whereby the outer ends of said spokes are secured thereto.

The inner end of the sleeve 3 is threaded as indicated by the numeral 8, and these threads are adapted to receive a concentrically arranged socket member 9 which is disposed to circumferentially surround the sleeve 3. As shown in Figs. 2 and 3, this socket member is formed to embody a circular and vertical wall 10 which is located on a plane perpendicular to the axis of the axle 4 and is formed with spaced and integral webs 11, the latter being formed to laterally project from the wall 10 and are of substantially triangular formation. By spacing the webs 11 with respect to each other, a plurality of sockets 12 are formed between the same. These sockets are of outwardly tapered formation and are arranged to laterally receive the enlarged ends 13 of the spokes 2, and said spokes are further retained in the sockets 12 by the provision of an annular wall 14 upon the sleeve 3, said latter wall extending parallel with the wall 10. Also, the sides of the webs 11 contiguous to the sockets 12 are transversely solid for a limited distance, as is indicated by the numeral 15 and situated within the slots or bolts are equivalent fastening devices 16. It will be observed that the bolts 16 pass through openings formed centrally in the ends 13 of the spokes and that the slots 15 extend from the outer face of the webs 11. In this manner, when the wall 14 is removed, said spokes may be laterally withdrawn or passed into their sockets. Obviously, when the wall 14 is properly positioned the removal of said spokes from the sockets will be effectively prevented in a lateral direction and also, owing to the transverse bolts 16 radially directed pressures will be unable to withdraw said spokes from their stated positions within the sockets 12. Radial displacement of the spokes is further prevented by the tapering formation of the ends 13 and the corresponding formation of the sockets 12. The plates or flanges 10 and 14 are clamped together through the agency of transverse bolts 17, which are arranged to pass through alined openings formed in said plates or flanges and are equipped with nuts 18, whereby upon the tightening of the latter said plates will be drawn together and locked for uniform rotation.

In order to remove the spokes from the hub structure, the bolts 17 are removed from their applied positions upon the hub structure and the flange or plate 14 is rotated in any suitable manner so that a slot 19 formed therein will coincide with the spoke or spokes to be removed. This slot 19 is formed with lateral enlargements 20, through which a suitable tool may be inserted to loosen the nuts of the bolts 16. When this is accomplished it will be obvious that with the slot 19 suitably positioned any spoke in the wheel structure may be conveniently removed without affecting the balance of the wheel, the provision of the slot 19 renders the spokes easily accessible and prevents the wheel from being entirely disassembled in order to repair spoke fractures or the like.

The spokes are preferably formed from finely tempered spring steel, and terminates in curved and transversely reduced extremities 21 which are adapted to lie within a channel shaped rim 22 forming a part of the rim structure. The extremities 21 are so formed that an extended portion of the same will flatly engage with the interior of the rim 22 so that said spokes may exercise radially directed pressure upon the rim structure and also to enable the spokes to be considerably flexed without being fractured. It will be observed that the rim is provided with continuous side flanges 23, between which the extremities 21 project, and through the provision of these flanges lateral stresses imparted to the wheel at points along the rim structure will be to a great extent absorbed by the engagement between the flanges 23 and the extremities 20, or in other words such lateral stresses are well received by the wheel and are prevented from damaging the connections existing between the outer ends of the spokes and the rim structure. The rim 22 may be equipped with the usual form of a pneumatic tire 24 or with any other desired type or form of tire. The side flanges 23 are provided with transversely spaced openings or slots 25, which are located contiguous to the points of contact of the outer ends of said spokes with a rim 22, and through the provision of these slots all extraneous matter which may collect under the spokes may be readily removed and to a large extent this removal of extraneous material will be automatically accomplished by the jolting of the wheel over a road bed. Also, one or more of the extremities 21 of said spokes may be equipped with an opening through which the inflation valve stem 26 of the tire 24 may project. The extremities 21 terminates in eyes 27, through which transverse bolts 28 are adapted to pass, said latter bolts also pass through registering openings formed in the side flanges 23, in this manner the spokes may be rigidly yet flexibly secured to the rim structure.

From the foregoing description, taken in connection with the accompanying drawing it will be apparent that there is provided a wheel of considerable utility and one which will effectively serve to diminish the cost of tire up-keep and which will serve at the same time to enhance the comfort of the occupants of the vehicle with which the wheels are associated. Through the provision of the resilient spoke structure the weight upon the tires 24 is appreciably reduced when compared with the wear said tires will receive upon a wheel embodying a rigid spoke structure and many practical tests have disclosed the fact that the mileage of a pneumatic tire may be increased appreciably through the use of the wheel. Structurally, the wheel embodies the hub structure capable of securely clamping the inner ends of the resilient spokes and also permits of removal of said spokes in a simple and convenient manner when such removal is desired. Again, the rim structure serves to receive the radial thrusts of the spring spokes and is so related with the other ends of said spokes that lateral stresses may be readily absorbed without injury to the wheel.

What I claim is:

In a resilient vehicle wheel, a spoke receiving member rotatably mounted in connection with an axle, said member being provided with a plurality of laterally opening sockets having slotted side walls, spokes having their inner ends seated within said sockets, fastening means coöperative with said spokes and the slots of said side walls to receive said spokes to said member yet to admit of lateral removal of the spokes from said sockets, and a socket closing member arranged to inclose said sockets, said latter member having a slot formed therein whereby upon the registration of said latter slot with any one of said sockets the spoke seated therein may be removed from said hub structure without interfering with the remaining spokes.

In testimony whereof I affix my signature.

NICHOLAS RATCHFORD.